Figure 1:
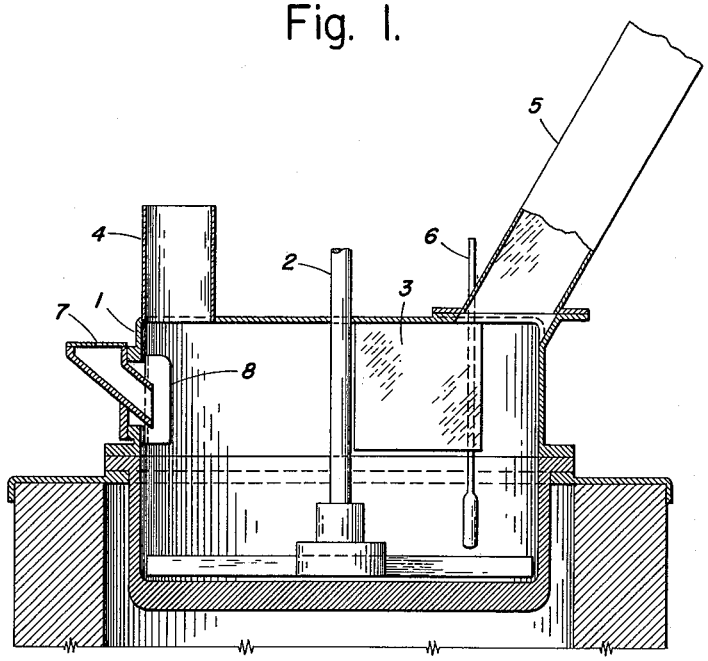

April 25, 1961   E. J. DUNN, JR., ET AL   2,981,776
STORAGE BATTERY MATERIAL
Filed June 10, 1959

INVENTORS
E. J. Dunn, Jr.
J. A. Orcino

AGENT

# 2,981,776
STORAGE BATTERY MATERIAL

Edward Joseph Dunn, Jr., Port Washington, N.Y., and Joseph Anthony Orsino, Mountain Lakes, N.J., assignors to National Lead Company, New York, N.Y., a corporation of New Jersey Filed June 10, 1959, Ser. No. 819,444

6 Claims. (Cl. 136—27)

This invention relates to a material for use in the manufacture of lead-acid storage batteries and has particular reference to a composition of matter comprising lead oxide, finely divided metallic lead and lead sulfate of various degrees of basicity.

This is a continuation-in-part of our copending application Serial No. 541,540, filed October 19, 1955, now abandoned.

Ordinarily, storage battery plates are made from a hardened lead alloy grid or framework, into which is pressed a paste made with lead oxide, water and diluted sulfuric acid. Such paste generally contains about 15% lead sulfate, 14% water, and the balance lead oxide and generally has a density of approximately 4.4 grams per cubic centimeter. The function of water in the paste is to produce a plastic state and to coalesce the individual particles so that the lead oxide may be compressed into the grid. If water alone is mixed with the oxide, however, the maximum amount of water which will still retain plastic properties in the paste will result in a paste density of around 5.3 grams per cubic centimeter. If plates are prepared from such a paste, the resultant dried plate will be impervious to the battery electrolyte and produce plates which are of low capacity and which will distort on discharge and eventually short circuit the battery.

In order to increase the porosity of the plate and to eliminate distortion during discharge, it has been customary to include a certain quantity of lead sulfate in the paste and the lead sulfate is generally produced by the addition of dilute sulfuric acid in aqueous solution to the oxide-water paste. Since the specific gravity of lead sulfate is 6.3 as compared to 9.3 for lead oxide, the presence of lead sulfate in moderate amount, say from 6 to 35% calculated as normal lead sulfate, in the paste results in a bulking action which increases the porosity of the paste.

The addition of sulfuric acid to the lead oxide paste mix, however, has certain disadvantages. When sulfuric acid is added to a lead oxide and water paste to produce lead sulfate, an exothermic reaction results with the evolution of considerable heat. This heat must be dissipated and expensive water jackets or blower fans must be installed in the mixing equipment. Further, the heat generated causes the evaporation of large quantities of water in the form of steam resulting in variations in the amount of water retained by the mix and variations in density of the mixture.

Still further, the temperature of the mixture is raised to a point where undesirable side reactions and presetting may take place making the paste difficult to handle in mechanical pasting machines and resulting in decreased capacity and life in the battery.

Still further, the blending, testing, and addition of acid to the mixing machines are time consuming, expensive and of a corrosive nature. The sulfuric acid corrodes the various metal portions of the mixing and handling equipment.

Attempts have been made in the past, directed towards obviating these disadvantages by preblending lead sulfate with the oxide in the dry state and then preparing the mixture with water alone in the mixing machinery. Unfortunately, however, such efforts have not been too successful since they necessitate the preparation of lead sulfate in the dry state, in itself a costly procedure, and such lead sulfate does not always possess the proper crystal structure and size compatible with satisfactory plate and battery capacity and life.

It is therefore an object of this invention to provide an improved method for the production of compositions suitable for use as storage battery active materials. A further object is to provide an improved method for production of lead oxide—lead sulfate compositions suitable for use as storage battery active materials. Another object is to provide such a method, which avoids addition of sulfuric acid to aqueous lead oxide pastes. Still another object is to provide such a method, which eliminates the necessity of separately preparing lead sulfate. Other objects and advantages will become apparent from the following more complete description and claims.

Broadly, this invention contemplates a method of preparing a composition suitable for use as active material in lead-acid storage battery plates which comprises the steps of reacting metallic lead at elevated temperatures simultaneously with air and with sulfuric acid.

Preferably, the process of this invention is carried out in a continuous furnace designed to oxidize metallic lead to lead oxide, such as, for example, the type of continuous furnace known as the "Barton pot."

Preferably, also, the process is carried out in such a manner that free metallic lead is always present, resulting in a composition which comprises some metallic lead along with lead oxide and lead sulfate.

The temperature employed in the reaction chamber should be at least about 621° F., assuring thereby that the lead does not solidify in the chamber, and may be as high as desired short of the melting point of lead oxide, about 1630° F. In practice, it has been found most convenient to maintain a temperature in the reaction zone between 650° and 1000° F.

It has been determined that after the pot has been initially started no extraneous heat is required to maintain these temperatures since the exothermic chemical action of the lead oxidation supplies all of the requisite heat.

The manner in which the sulfuric acid is added to the furnace (oxide pot) is not limited except that the acid and air, which will normally be added in the form of a stream to the furnace particularly where the reaction is carried out in a continuous fashion, are present simultaneously. As will be more fully brought out in the description of the accompanying drawing the acid may be added in various ways. It has been found preferable however, to add the sulfuric acid, which may be diluted or concentrated, directly to the air stream as or before the latter enters the furnace. This particular manner of addition appears to provide a more uniform dispersion of the acid in the reaction mixture, resulting in a more homogeneous product.

The employment of $H_2SO_4$, in the practice of this invention, is critical in that it cannot be replaced by $SO_2$. It has been established that if $SO_2$ is substituted for $H_2SO_4$ little or no lead sulfate is formed. Also, in using $H_2SO_4$, little or no $SO_3$ or $SO_2$ is produced in the atmosphere of the furnace since the reaction between the acid and litharge is practically instantaneous. Free $H_2SO_4$ cannot exist in the presence of a relatively large amount of litharge. Therefore, before the $H_2SO_4$ can even be heated to any great extent and subsequently be reduced, it reacts to form the sulfate. This has been born out by quantitative studies, pH determinations and by the fact that practically no corrosion of the iron machinery (stirrer, baffles, hoppers, etc.) takes place as would be the case were $H_2SO_4$ to remain or $SO_2$ be produced in the atmosphere of the furnace.

In the practice of this invention it is generally desirable to produce a product consisting of about 10 to 50% Pb, 10 to 70% PbO and 6 to 35% $PbSO_4$.

The presence of free lead in the lead oxide-lead sulfate composition imparts desirable properties to the subsequently prepared storage battery paste. For example, after the freshly prepared moistened paste has been applied to a battery grid, the paste undergoes a drying operation. This results in the paste contracting within the grid frame work, thereby loosening the paste-to-grid bond and causes dried paste particles to fall off the plates. The free lead, within the paste composition, by chemically converting to lead oxide and thereby expanding, counteracts this shrinking of the drying paste and assures a strong paste-to-grid bond. This lead oxidizing reaction, being sufficiently exothermic, also helps to carry the drying operation to completion. The amount of free lead present in a paste must however be controlled. Pastes containing too high, over 50% Pb will eventually produce blistering and/or spalding of the sponge lead in the pasted negative plates. Pastes containing free lead under about 10% will not effectively produce the desired hydrosetting properties alluded to above.

In the practice of this invention the metallic lead content is generally controlled by regulating the rate of metal feed and the operating temperatures; high temperatures producing products of low metal contents, low temperatures producing products of high metal contents. In addition, it will be understood that since the process of this invention is continuous the products are continuously withdrawn at a stage where some materials have undergone a complete reaction and others have not. For instance, unoxidized lead is withdrawn as a component of the products of this invention.

In regard to the litharge percentages, a litharge content under about 10% is apt to hinder the formation of $PbSO_4$. Although no adverse effect, per se, results in having the litharge content exceed about 70%, it is limited however, due to the Pb and $PbSO_4$ amounts desired in the end product. For purposes of simplicity the above recited litharge percentages and those recited in the following examples represent free litharge and the chemically combined litharge present due to the formation of lead sulfates.

Figure 2:
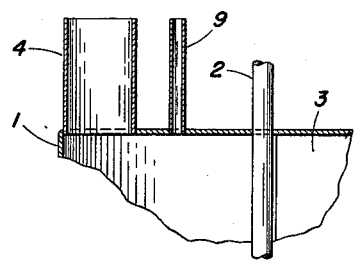

In the accompanying drawing Figure 1 represents an elevation of a furnace designed for carrying into effect the present invention. Figure 2 represents a furnace, also designed for carrying into effect the present invention, and is meant to represent a furnace identical, in all respects, to the furnace represented by Figure 1 except for the addition of a funnel which is indicated by reference number 9.

The pot 1, appropriately mounted so as to be capable of being initially heated, has a stirrer 2 driven at about 150 r.p.m. constant speed by a motor drive not shown, a fixed baffle or dash plate 3, an air and sulfuric acid inlet 4, an uptake 5 leading to a settling chamber not shown, a pyrometer 6, a trough 7 through which molten lead is fed into the pot and a guard plate 8 which minimizes any splashing.

As an alternative method for adding the sulfuric acid, it may be added, instead of through the air intake 4, in a furnace so equipped, through a funnel 9 (Figure 2) by means of a conventional automatic pipette not shown.

By way of illustration, the following examples are offered as illustrative embodiments of the invention with regard to the preparation of the desired material of this invention in a furnace commonly referred to as the Barton pot.

*Example I*

After the pot 1, was properly heated, enough molten lead was fed into the pot, through trough 7 to more or less cover the bottom of the pot, thereby assuring that the bottom of the stirrer 2 was always submerged in lead while the process was in operation. Lead was then similarly fed in the pot 1 at a rate of 100 lbs. per hour. Simultaneously, air was drawn in through inlet 4 by means of a suction fan, not shown, located above the settling chamber. Sulfuric acid, 81.6%, $SO_3$, was then added at a rate of ½ gal. per hour by means of a standard automatic pipette, not shown, to the air stream as it passed through inlet 4. The resulting mixture of Pb, PbO and $PbSO_4$, by means of the air stream, was then drawn out of the pot through uptake 5 into the settling chamber, not shown. The operating temperature was observed, by means of pyrometer 6, to be about 800° F. Periodic analysis of the continuous process showed a product consisting of about 12% Pb, 68% PbO and 20% $PbSO_4$.

*Example II*

In a similar system, during which the metal feed rate was 200 lbs. per hour, sulfuric acid, 44.9% $SO_3$, feed rate was ¾ gal. per hour and the recorded temperature was 760° F., a product consisting of about 32% Pb, 62% PbO and 6% $PbSO_4$ was produced.

*Example III*

In another similar system, employing a pot equipped with an inlet funnel 9 during which the metal feed rate was 200 lbs. per hour, sulfuric acid, 81.6% $SO_3$, added through funnel 9 by means of a conventional pipette, feed rate was 1½ gal. per hour and the observed temperature was 700° F., a product consisting of about 50% Pb, 15% PbO and 35% $PbSO_4$ was produced.

*Example IV*

The lead-lead sulfate-litharge mixtures prepared by the above examples were used to make storage battery plates according to the following general procedure.

Positive pastes were prepared by adding water to the mixtures and then mixing for 15 minutes in a conventional type battery paste mixer.

Negative pastes were prepared by adding first lampblack, blanc fixe, and an organic material to the mixture and then adding water to the expander mixtures.

The following table shows the amounts of water added to each of the mixtures and the resulting paste densities.

TABLE I

| Pb-$PbSO_4$-PbO Mixtures made by methods of examples | Added water, cc. per pound of mixture | | Paste Density, grams per c. cm. | |
|---|---|---|---|---|
| | positive paste | Negative paste | positive paste | negative paste |
| Example I | 75 | 70 | 4.4 | 4.5 |
| Example II | 75 | 70 | 4.4 | 4.5 |
| Example III | 85 | 80 | 3.9 | 4.0 |

The resulting pastes were subsequently applied to battery plates and were suitable for use in heavy duty type batteries where high density, long life pasted plates are required.

The process of this invention provides an improved method for the production of compositions suitable for use in storage battery active material pastes. It is simple and easily carried out as compared with the processes heretofore available for producing compositions of the type desired, and is largely free from the corrosion difficulties experienced with the prior processes. The compositions produced, moreover, possess improved properties, particularly with respect to uniformity of composition.

While the foregoing examples illustrate certain preferred procedures and proportions, no undue limitations should be deduced therefrom, and the invention is not to be limited, except as set forth in the appended claims.

We claim:

1. A method of preparing a composition suitable for use as active material in lead-acid storage battery plates wich comprises the steps of continuously reacting metallic lead at a temperature between 621° F. and 1630° F. simultaneously with air and with sulfuric acid, said sulfuric acid reacting substantially instantaneously to form lead sulfate prior to any substantial thermal decomposition of said acid, and continuously withdrawing a product comprising lead oxide in amount between 10 and 70 percent, lead sulfate in amount between 6 and 35 percent and metallic lead in amount between 10 and 50 percent.

2. A method of preparing a composition suitable for use as active material in lead-acid storage battery plates which comprises the steps of continuously reacting metallic lead at a temperature between 621° F. and 1630° F. simultaneously with air and with sulfuric acid, said reaction being carried out in the presence of free metallic lead, said sulfuric acid reacting substantially instantaneously to form lead sulfate prior to any substantial thermal decomposition of said acid, and continuously withdrawing a product comprising lead oxide in amount between 10 and 70 percent, lead sulfate in amount between 6 and 35 percent and metallic lead in amount between 10 and 50 percent.

3. A method of preparing a composition suitable for use as active material in lead-acid storage battery plates which comprises the steps of continuously reacting metallic lead at a temperature between 650 and 1000° F. simultaneously with air and with sulfuric acid, said sulfuric acid reacting substantially instantaneously to form lead sulfate prior to any substantial thermal decomposition of said acid, and continuously withdrawing a product comprising lead oxide in amount between 10 and 70 percent, lead sulfate in amount between 6 and 35 percent and metallic lead in amount between 10 and 50 percent.

4. A method of preparing a composition suitable for use as active material in lead-acid storage battery plates which comprises the steps of continuously reacting metallic lead at a temperature between 621° F. and 1630° F. with air in a reaction zone, said air being fed in the form of a stream to said reaction zone, and concurrently adding sulfuric acid to said stream of air said sulfuric acid reacting substantially instantaneously to form lead sulfate prior to any substantial thermal decomposition of said acid, and continuously withdrawing a product comprising lead oxide in amount between 10 and 70 percent, lead sulfate in amount between 6 and 35 percent and metallic lead in amount between 10 and 50 percent.

5. A method of preparing a composition suitable for use as active material in lead-acid storage battery plates which comprises the steps of continuously reacting metallic lead at a temperature between 621° F. and 1630° F. with air in a recation zone, said air being admitted in the form of a stream to said reaction zone, maintaining free metallic lead in said reaction zone, and continuously adding sulfuric acid to said reaction zone, said sulfuric acid reacting substantially instantaneously to form lead sulfate prior to any substantial thermal decomposition of said acid, and continuously withdrawing a product comprising lead oxide in amount between 10 and 70 percent, lead sulfate in amount between 6 and 35 percent and metallic lead in amount between 10 and 50 percent.

6. A method of preparing a composition suitable for use as active material in lead-acid storage battery plates which comprises the steps of continuously reacting metallic lead at a temperature between 621° F. and 1630° F. with air in a reaction zone, said air being fed in the form of a stream to said reaction zone, and concurrently adding sulfuric acid to said stream of air, said sulfuric acid being added dropwise to said stream of air, said sulfuric acid reacting substantially instantaneously to form lead sulfate prior to any substantial thermal decomposition of said acid, and continuously withdrawing a product comprising lead oxide in amount between 10 and 70 percent, lead sulfate in amount between 6 and 35 percent and metallic lead in amount between 10 and 50 percent.

References Cited in the file of this patent

UNITED STATES PATENTS

| | | |
|---|---|---|
| 1,187,949 | White | June 20, 1916 |
| 1,524,315 | Schaeffer et al. | Jan. 27, 1925 |
| 2,182,479 | Johnstone | Dec. 5, 1939 |
| 2,235,487 | Mayer | Mar. 18, 1941 |
| 2,300,627 | Merson | Nov. 3, 1942 |